United States Patent [19]

Burton et al.

[11] Patent Number: 5,075,086
[45] Date of Patent: Dec. 24, 1991

[54] STABILIZED CONCENTRATED SULPHURIC ACID COMPOSITIONS

[75] Inventors: John T. Burton, St. Lazare; Drew J. Drexler, Guelph, both of Canada

[73] Assignee: Marsulex Inc., Ontario, Canada

[21] Appl. No.: 452,042

[22] Filed: Dec. 18, 1989

[30] Foreign Application Priority Data

Dec. 22, 1988 [CA] Canada .................................. 586929

[51] Int. Cl.$^5$ ............................................. C01B 17/69
[52] U.S. Cl. ................................ 423/265; 252/400.21; 252/400.22; 423/522
[58] Field of Search ............... 423/522, 270, 271, 272, 423/273, 265; 252/400.22, 400.21, 400.2, 188.27, 188.28; 210/699, 700; 156/642; 148/DIG. 51

[56] References Cited

U.S. PATENT DOCUMENTS 3,701,825 10/1972 Radimer ............................. 423/273
3,903,244 9/1975 Winkley ............................. 423/272
3,951,840 4/1976 Fujino et al. ....................... 423/266
4,059,678 11/1977 Winkley ............................. 423/273
4,383,104 5/1983 Sasaki et al. ....................... 423/63
4,414,183 11/1983 Sasaki et al. ....................... 210/688
4,900,469 2/1990 Farr et al. .......................... 423/272

OTHER PUBLICATIONS

Chemical Abstracts, 91:47254e (1979), Liszewski, L. J. and Battaglia, C. J.

Primary Examiner—Michael Lewis
Assistant Examiner—Stephen G. Kalinchak
Attorney, Agent, or Firm—Cushman, Darby & Cushman

[57] ABSTRACT

The present invention provides a stabilized concentrated sulphuric acid composition containing a chemical additive selected from a group of aminoalkylphosphonates that increases the precipitation threshold of impurities in solution, thereby suppressing the precipitation of said impurities and the formation of "cloudy acid".

10 Claims, No Drawings

STABILIZED CONCENTRATED SULPHURIC ACID COMPOSITIONS

The present invention relates to a stabilized concentrated sulphuric acid composition containing a chemical additive selected from a group of aminoalkylphosphonates that increases the precipitation threshold of impurities in solution, thereby suppressing the precipitation of said impurities and thereby suppressing the formation of "cloudy acid".

Concentrated sulphuric acid and oleum are widely used in many industrial processes. The sulphuric acid content of these acids is the most common basis for their identification and indication of strength. Commercial grades of concentrated acids of these type typically include those containing 93% and 98% sulphuric acid, and more highly concentrated material containing 104.50%, 105.62%, 106.75% and 114.63% (corresponding to 20%, 25%, 30% and 65% oleum, respectively), or a specially blended material of a desired intermediate strength.

Many properties of concentrated sulphuric acid compositions, such as freezing point, boiling point, and viscocity, are not easily predicted for a given particular sulphuric acid concentration. The predicted values for these properties are more often determined by interpolation of data assembled in tabular and graphic forms. Another important parameter, solubility of dissolved species, is also not readily predicted.

Of particular concern in the industry is the quality of the concentrated sulphuric acid that is produced and available for use in a variety of different processes. The minimization of impurities in the sulphuric acid compositions is of prime importance. Some of the impurities are inherent from the particular manufacturing process, and may accumulate or arise through handling (e.g. transferring, pumping, etc.) and storage. Impurities arising from storage are generally associated with the formation of products of corrosion processes. Although precautionary steps are taken within the industry to minimize the impurities levels or reduce the levels to acceptable limits, these steps are not always adequate in each instance.

One such instance pertains to the formation of small particles of iron compounds (notably iron (II) and iron (III) compounds, presumably sulphates) in concentrated sulphuric acid compositions. The particles form as the solubility limits of these compounds are exceeded. The iron accumulates in the acid composition during contact of the acid with iron-containing metal surfaces (steels and stainless steels), such as would be constantly encountered in the process of manufacturing, handling and storage. Frequent contact between concentrated sulphuric acid and iron-containing metals is essentially unavoidable. Over time, the accumulation of iron results in the inevitable formation of fine particles that give the acid a milky appearance, and the mixture is commonly referred to as "cloudy acid".

The propensity for "cloudy acid" development generally follows the solubility profile of iron (III), i.e. the solubility of iron (III) in sulphuric acid decreases with increasing acid concentration to a minimum at about 99.4% sulphuric acid, and then increases somewhat as the acid concentration is further increased. Therefore, the formation of "cloudy acid" is most frequently encountered, but not restricted to, around the higher range of sulphuric acid concentrations. The rate at which an initially clear acid becomes cloudy is a function of acid strength (concentration) and initial iron concentration.

The particles making up the cloudiness are very fine and settle only very slowly in this mixture. Not only are the aesthetics of the acid compromised, but the presence of a milky mixture makes the acid unacceptable for use in some applications. The removal of these particles, once formed, is difficult to accomplish and there continues to be, in the sulphuric acid industry, a long felt want to eliminate the particulate matter.

A symptomatic solution to the problem of cloudy acid is filtration. This technology, however, is not without its drawbacks. Owing to the viscosity of the liquid, the filtration process is slow, and the nature of the liquid and small size of the suspended particles makes the required equipment expensive and maintenance difficult. The filter medium has a limited load capacity, requires replacement and is prone to iron breakthrough if flowrates are perturbed. The process of filtration is referred to as a symptomatic solution since only the insoluble portion of the impurity (in this case iron (III) compounds) is removed thereby leaving the filtered sulphuric acid saturated with respect to the impurity removed, and susceptible to clouding again since any increase in the quantity of this culprit impurity will cause its solubility to be exceeded.

A temporary and clearly not very practical solution to the cloudy acid problem is the dilution of the iron in the acid with iron-free acid of the same or lesser strength. This method is of very limited use and can clarify an already cloudy acid only if the dilution reduces the resultant iron content well below its solubility limit, and even still, the dissolution requires days.

A method to prevent precipitation of iron in photographic processor effluents has been disclosed (Chem. Abstr., 91:47254e; Res. Discl., 1979, 181, 230). The compounds disclosed of use therein "include the polyphosphates and organophosphates, such as amino-N,N-dimethylenephosphonic acids, hydroxyalkylidenephosphonic acids, aminodiphosphonic acids, and N-acylaminodiphosphonic acids". There is a contradiction of terms in this disclosure in that the exemplified compounds included are not phosphates per se, but rather phosphonates. These "organophosphates" disclosed would not be considered for use in concentrated sulphuric acid for two main reasons. Firstly, the exemplified compounds would be considered not to survive the extreme conditions of concentrated sulphuric acid, even for short periods of time; it is understood that generally organic compounds decompose or "char" (cause discoloration) in concentrated sulphuric acid. Secondly, under the unique chemical environment provided by concentrated sulphuric acid, the properties and behaviour of the "organophosphates" exemplified could not be reasonably predicted; the amino group of these compounds ought be expected to undergo protonation, introducing a positive charge into the compound, and thus possibly repel iron.

Now, surprisingly, a chemical additive selected from a group of aminoalkylphosponates has been found that effectively stabilizes concentrated sulphuric acid by suppressing cloudiness arising from iron (III) compounds. It is indeed very surprising that these same additives survive the harsh chemical environment encountered in concentrated sulphuric acid and may be applied in very small amounts.

It is an object of the present invention to provide a stabilized concentrated sulphuric acid composition containing a chemical additive selected from a group of aminoalkylphosphonates that effectively suppresses cloudiness formation.

It is a further object of the present invention to provide a process for the preparation of said stabilized concentrated acid composition as hereinbefore described.

Accordingly, in one aspect of the present invention there is provided a stabilized concentrated sulphuric acid composition comprising from about 90 to about 100 percent sulphuric acid and a sufficient amount of a compound of formula:

$$R_1R_2NZ \quad (I)$$

wherein $Z=-(CHR_3)_xPO(OH)_2$, wherein $x=1-3$, and $R_1$ and $R_2$ are each selected independently from the group consisting of: hydrogen, Z (wherein Z is defined as above), a $C_{1-6}$-carboxyalkyl group and a group $-((CHR_3)_yNZ)_bZ$, wherein $y=1-6$ and $b=1-4$, and $R_3$ is hydrogen or methyl;

to increase the precipitation threshold of dissolved iron (III).

By the term precipitation threshold is meant the limit below which no precipitation occurs. In the present instance, the precipitation threshold of dissolved iron (III) is the concentration limit of iron (III) below which no cloudiness due to iron (III) occurs. Therefore the effect of increasing the precipitation threshold increases this concentration limit.

Preferably, the concentrated sulphuric acid composition comprises from about 93 to about 99.5 percent sulphuric acid. Also, preferably, in the compound of formula I, $R_1$ and $R_2$ are each selected independently from the group consisting of: hydrogen, Z, a $C_{1-3}$-carboxyalkyl group and a group $-((CHR_3)_yNZ)_bZ$, wherein $y=2$ and $b=1$ or 2; and $x=1$ and $R_3$ is hydrogen.

More preferably, particular compounds of formula I of use in the present invention are selected from the group consisting of amino-tri(methylenephosphonate), ethylenediaminetetra(methylenephosphonate) and diethylenetriaminepenta(methylenephosphonate).

In a further aspect of the present invention there is provided a process for the preparation of a stable concentrated sulphuric acid composition containing from about 90 to about 100 percent sulphuric acid comprising the addition of a sufficient amount of a compound of formula I (hereinafter referred to a stabilizer) to increase the precipitation threshold of dissolved iron (III).

The preferred amount of stabilizer for use in the present invention is selected in the range from about 0.5 to about 5 g/g of iron in the acid. However, exact and sufficient amounts within and outside this range may be readily determined by the skilled artisan.

In the practice of the process of the present invention, the stabilizer can be added directly, whether as a solid or a liquid, to concentrated sulphuric acid. The stabilizer may be added as the free acid, or salt or partial salt derivative thereof. In those instances where the stabilizer is a solid, an aqueous solution of the stabilizer can be added to the concentrated acid if the introduction of a small quantity of water is tolerable, i.e. a lower strength of acid is desired. Alternatively, the stabilizer as a solid can first be dissolved in concentrated acid in greater amounts than is necessary, and the resulting solution used to prepare further compositions of the invention. This latter procedure is particularly useful for preparing an acid composition of the invention by fortification of a weaker strength sulphuric acid with a more highly concentrated sulphuric acid or with sulphur trioxide. In this instance, the stabilizer may initially be added to either the weaker or stronger acid, or both, in a pre-determined amount to provide a targeted sufficient amount for the resultant expected acid concentration. Under normal circumstances, the propensity for cloudiness formation is particularly high during such a fortification procedure since the solubility of iron impurities decreases significantly as the concentration of acid approaches 99.4%. Therefore, fortification of sulphuric acid can be accomplished without the development of cloudiness by ensuring there is sufficient stabilizer present during the fortification procedure.

The stabilizers for use in the present invention cannot directly reduce the cloudiness, once formed, in concentrated sulphuric acid. Therefore, preferably, the stabilizers must be added prior to the existence of cloudiness or must be added prior to, or be present during, fortification, which process also constitutes part of the present invention.

Processes for the preparation of stabilized concentrated acids from cloudy sulphuric acids by indirect means, such as dilution with stabilized sulphuric acid compositions or the combination of adding stabilizer and dilution, also form part of the present invention.

Cloudiness in concentrated sulphuric acid is determined by the degree of light (wavelength 420 nanometers) transmitted through a sample, recorded as percent transmittance (% T). Samples of acid considered cloudy have transmittance values less than 90%.

The use of minimum effective levels of stabilizers provides compositions of sufficient quality, with respect to "organics" content, to be compatible with most end-uses. Compositions containing sufficient stabilizer displayed essentially no discoloration in a "Char" test (a standard test for "organics" used in the industry). The stabilizers do not accelerate the corrosion of carbon steel by the acid. Also, combinations of stabilizers may be used.

Preferred embodiments of the present invention are illustrated by means of Examples.

EXAMPLE 1

To virgin 99.0% sulphuric acid was added 25, 50, 75 or 100 ppm of the stabilizer amino-tri(methylenephosphonate) (AMPA), ethylenediaminetetra(methylenephosphonate) (EDMPA) or diethylenetriaminepenta(methylenephosphonate) (DTMPA). The stabilizing potential of each of these sulphuric acid compositions was examined in the following manner. Aliquots of each of these sulphuric acid compositions were spiked with 20, 40 or 50 ppm iron (III) and transferred to Pyrex culture flasks. Sets of untreated acids with the same iron levels were also prepared as controls. The flasks were capped and maintained in a constant temperature bath and monitored for the development of cloudiness.

Cloudiness was measured as Percent Transmittance (% T) for the acids using a Hach dr/2 Spectrometer. Readings were taken at a wavelength of 420 nanometers using glass cells with a 1 inch path length, against deionized water as a reference. Acids were agitated prior to all % T readings. Samples of acid considered cloudy have transmittance values less than 90%.

Iron (III) concentrations were determined colorimetrically at a wavelength of 510 nanometers, using a Hach dr/2 Spectrometer and phenanthrolinehydroxylamine reagents.

AMPA, EDMPA, and DTMPA (250 ppm) prevented precipitation of ferric sulfate for several weeks in 99.2% $H_2SO_4$ spiked with 40 ppm iron (III). In the absence of stabilizers, such acid would turn cloudy in less than one day.

AMPA, EDMPA and DTMPA also suppressed cloudiness in acids containing 20-50 ppm iron (III) with stabilizer loadings as low as 25 ppm. Table 1 summarizes the effectiveness of these additives in 99% sulfuric acid at 20° C.

TABLE 1

| | Effectiveness After Two Months in 99% Sulfuric Acid | | | | | | | | | | | |
|---|---|---|---|---|---|---|---|---|---|---|---|---|
| | | Stabilizer (dosage in ppm) | | | | | | | | | | |
| | | AMPA | | | | EDMPA | | | | DTMPA | | |
| Fe (III) (ppm) | Blank | 25 | 50 | 75 | 100 | 25 | 50 | 75 | 100 | 25 | 50 | 75 | 100 |
| 20 | Y | N | N | N | N | N | N | N | N | N | N | N | N |
| 40 | Y | Y | Y | Y | N | Y | N | N | N | N | N | N | N |
| 50 | Y | Y | Y | Y | N | Y | N | N | N | Y | N | N | N |

"N" = Acid did not turn cloudy after 2 months at 20° C.
"Y" = Acid did turn cloudy after 2 months at 20° C.

The data listed in Table 1 shows that 99% sulphuric acid containing as little as 20 ppm iron (III) is cloudy after 2 months. At this level of iron and in the presence of as little as 25 ppm of any one of the three stabilizers AMPA, EDMPA or DTMPA, the cloudiness is prevented for at least 2 months. In the case of 99% sulphurc acid containing the higher level of 50 ppm iron (III), 50 ppm of EDMPA or DTMPA is effective at preventing cloudiness for at least two months. At this 50 ppm iron (III) level, 100 ppm of AMPA is required for such prevention.

The stabilizers for use in the present invention provide the advantage of enabling the production of a concentrated sulphuric acid composition that exhibits a suppression to the onset of cloudiness. The stabilized concentrated sulphuric acid compositions of the present invention can be stored for up to several months with substantially no cloudiness development. The process of the present invention is useful during shut-down periods and at subsequent start-ups of sulphuric acid manufacturing plants where the propensity for cloudy acid production is great. Also, now higher strength sulphuric acids can be used in those processes where the presence of particles was undesirable, yet unavoidable.

We claim:

1. A stabilized composition consisting essentially of concentrated sulfuric acid and containing from about 90 to about 100 percent sulphuric acid into which iron impurities have dissolved and a sufficient amount of a compound of formula:

$$R_1R_2NZ \qquad (I)$$

wherein $Z = —(CHR_3)_xPO(OH)_2$, wherein $x = 1-3$, and $R_1$ and $R_2$ are each selected independently from the group consisting of: hydrogen, Z (wherein Z is defined as above), a $C_{1-6}$-carboxyalkyl group and a group $—((CHR_3)_yNZ_b)Z$, wherein $y = 1-6$ and $b = 1-4$, and $R_3$ is hydrogen or methyl;

to increase the precipitation threshold of dissolved iron (III).

2. A stabilized composition as claimed in claim 1, wherein said composition comprises from about 93 to about 99.5 percent sulphuric acid.

3. A stabilized composition as claimed in claim 1, wherein, in the compound of formula I, $R_1$ and $R_2$ are each selected independently from the group consisting of: hydrogen, Z, a $C_{1-3}$-carboxyalkyl group and a group $—((CHR_3)_yNZ)_bZ$, wherein $y = 2$ and $b = 1$ or 2; and $x = 1$ and $R_3$ is hydrogen.

4. A stabilized composition as claimed in claim 3, wherein the compound is selected from the group consisting of amino-tri(methylenephosphonate), ethylenediaminetetra(methylenephosphonate) and diethylenetriaminepenta(methylenephosphonate).

5. A stabilized composition as claimed in claims 1, 3 or 4, wherein the amount of the compound of formula I is selected in the range from about 0.5 to 5 g/g of dissolved iron (III).

6. In a process for the preparation of a stable composition consisting essentially of sulfuric acid of about 90 to about 99.5 percent concentration, the addition of a sufficient amount of a compound of formula I, as defined in claim 1, to raise the precipitation threshold of dissolved iron (III).

7. A process as claimed in claim 6, wherein the concentrated sulphuric acid composition contains from about 93 to about 99.5 percent sulphuric acid.

8. A process as claimed in claim 6, wherein, in the compound of formula I, $R_1$ and $R_2$ are each selected independently from the group consisting of: hydrogen, Z, a $C_{1-3}$-carboxyalkyl group and a group $—((CHR_3)_yNZ)_bZ$, wherein $y = 2$ and $b = 1$ or 2; and $x = 1$ and $R_3$ is hydrogen.

9. A process as claimed in claim 6, wherein the compound is selected from the group consisting of amino-tri(methylenephosphonate), ethylenediaminetetra(methylenephosphonate), and diethylenetriaminepenta(methylenephosphonate).

10. A process as claimed in claim 6, 8 or 9, wherein the amount of compound of formula I is selected in the range from about 0.5 to 5 g/g of dissolved iron (III).

* * * * *